United States Patent [19]

Leoni et al.

[11] 4,237,274

[45] Dec. 2, 1980

[54] PROCESS FOR THE PREPARATION OF SOLUTIONS OF CELLULOSE DERIVATIVES WHICH CAN BE COAGULATED AND SPUN TO FORM REGENERATED CELLULOSE BODIES

[75] Inventors: Roberto Leoni, Milan; Alberto Baldini, Garlasco; Gianfranco Angelini, Buscate, all of Italy

[73] Assignee: SNIA VISCOSA Societa' Nazionale Industria Applicazioni Viscosa S.p.A., Milan, Italy

[21] Appl. No.: 14,632

[22] Filed: Feb. 23, 1979

[30] Foreign Application Priority Data

Feb. 24, 1978 [IT] Italy ................................ 20540 A/78

[51] Int. Cl.³ ........................ C08B 16/00; C08L 1/02
[52] U.S. Cl. .................................. 536/56; 106/163 R; 106/168; 106/187; 536/57
[58] Field of Search ............................. 536/56, 57, 99; 106/168, 163 R, 187

[56] References Cited

U.S. PATENT DOCUMENTS

| | | | |
|---|---|---|---|
| 3,776,692 | 12/1973 | Franklin et al. | 536/99 |
| 4,022,631 | 5/1977 | Turbak et al. | 106/168 |
| 4,056,675 | 11/1977 | Turbak et al. | 536/57 |
| 4,086,418 | 4/1978 | Turbak et al. | 536/57 |
| 4,097,666 | 6/1978 | Johnson et al. | 106/187 |
| 4,145,391 | 3/1979 | Rodier | 106/163 R |

OTHER PUBLICATIONS

*Polymer*, 1977, vol. 18, Feb., pp. 203 and 204.
"Solvent Spun Rayon, Modified Cellulose Fibers and Derviatives," Turbak, editor, Symposium, Mar. 21-23 1977, pp. 21 & 74.
Hergert, Hammer and Turbak, article "New Methods for Preparing Rayon", presented at the 4th International TAPPI Conference in Chicago, 1977, pp. 28-34.

*Primary Examiner*—Ronald W. Griffin
*Attorney, Agent, or Firm*—Wenderoth, Lind & Ponack

[57] ABSTRACT

A process for the preparation of solutions of cellulose derivatives from which formed bodies, such as fibres or films, of regenerated cellulose can be obtained by coagulation and regeneration, e.g. by wet spinning, is disclosed. The cellulose is transformed into a methylol derivative containing more than 2 units of formaldehyde per anydroglucosidic unit, which derivative is soluble in organic solvents of the class consisting of polar aprotic solvents constituted by N-substituted amides, pyridine and formamide. The methylol derivative is prepared by treating cellulose with paraformaldehyde and dimethylsulphoxide. The methylol derivative is then dissolved in one of the aforesaid solvents, preferably dimethylformamide or dimethylacetamide, to provide spinnable viscous solutions from which formed bodies can be obtained, e.g. by spinning in an aqueous alkaline bath.

23 Claims, No Drawings

PROCESS FOR THE PREPARATION OF SOLUTIONS OF CELLULOSE DERIVATIVES WHICH CAN BE COAGULATED AND SPUN TO FORM REGENERATED CELLULOSE BODIES

BACKGROUND OF THE INVENTION

(a) The Field of the Invention

The present invention relates to a process for the preparation of solutions of cellulose derivatives from which regenerated cellulose bodies may be formed by coagulation and regeneration, in particular by wet spinning. Most specifically, the derivatives in question are reaction products of cellulose and formaldehyde, and the solvents employed are organic solvents, preferably aprotic polar solvents.

Cellulose derivatives of the kind of those to which the invention relates have been prepared according to the known art and are generally considered as "methylol derivatives" and therefore this expression will be used in the present description as well. These derivatives are well identified by the presence in their infrared spectrum of an absorption band close to 945 cm$^{-1}$ whose intensity increases with increasing content of formaldehyde units per anydroglucosidic unit, as titrated by the $Na_2SO_3$ method. This absorption band could be related to C—O stretching of —O—$CH_2$—OH group.

There are however doubts as to the expression "methylol derivatives" accuracy from the chemical viewpoint since the chemical behaviour of the derivatives which are actually formed does not wholly correspond to that which should have been expected, according to present knowledge, from cellulose methylol derivatives, viz. from compounds having a hemiacetalic structure R—O—$CH_2$—OH. However said doubts are not relevant to the process according to the invention and to the results which may be achieved therefrom, and therefore the expression "methylol derivatives" will be employed to designate the derivatives to which the invention refers and should be understood regardless of any possible doubts as to its scientific accuracy.

The invention provides a process which permits the preparation of filaments and fibres or the preparation of films and other shaped bodies of regenerated cellulose, without the use of chemical agents (carbon sulfide, soda) which are characteristic of the classic viscose process.

Binary or ternary systems which are capable of dissolving cellulose and from which the cellulose itself may theoretically be regenerated are known, but such systems have a pure experimental interest or at least are not adapted to industrial applications, for various reasons. Some of them are described e.g. in Cellulose Chemistry and Technology, 9 (1975) page 265 onwards. Another known system is constituted by paraformaldehyde or formaldehyde ($CH_2O$) and dimethylsulfoxide (DMSO), and in this system the cellulose derivatives which form are considered, as it has been said, as methylol derivatives. In U.S. Pat. No. 4,022,631 a method for the regeneration of the cellulose from solutions in said solvent system is described and claimed, which is characterized by the use of a coagulating bath which is alkaline because of the presence of ammonium or amino compounds or alkali sulfites or thiosulfate.

SUMMARY OF THE INVENTION

The Applicant has now found a new and different process for the preparation of solutions of cellulose derivatives in organic solvents, which may be coagulated or spun, which has considerable technical and economical advantages with respect to known processes and is better suited to industrial applications, as will be understood hereinafter.

The new process is characterized in that a methylol derivative of cellulose is prepared, which derivative contains more than 2, and preferably at least 3 units of formaldehyde ($CH_2O$) per anhydroglu-cosidic unit, and said derivative is dissolved in an organic spinning solvent other than dimethylsulphoxide (DMSO). Preferably the derivative is prepared by contacting cellulose and paraformaldehyde with DMSO.

The spinning solvent is preferably an aprotic polar spinning solvent which is an N-substituted amide. It may be chosen from the group consisting of dimethylformamide (DMF), dimethylacetamide, tetramethylurea, N-methylpyrraolidone and hexamehtylphosphoramide (HMPT).

From the viscose solution of the methylol-derivative in the spinning solvent, the derivative may be precipitated and the cellulose regenerated in a suitable coagulating bath to form cellulose filaments, films or other shaped bodies.

DESCRIPTION OF THE PREFERRED EMBODIMENTS

According to a first preferred embodiment of the invention, the methylol derivative of the cellulose is prepared by dissolving the cellulose in a system constituted by paraformaldehyde and DMSO, by separating the methylol derivative from the DMSO and bringing it into solution, without regeneration of the cellulose, in the spinning solvent. A preferred way of separating the methylol derivative from the DMSO consists of precipitating it from the solution in DMSO by means of at least one agent which is a non-solvent of the derivative and non-regenerating agent of the cellulose and is miscible with DMSO.

The non-solvent non-regenerating agents employed are typically ethers, alcohols, aldehydes and ketones such as cyclohexanone, acetone and benzaldehyde, chlorinated organic liquids such as $CHCl_3$ or further other non-solvent non-regenerating agents such as acetonitrile and ethyl acetate. Typical examples of ethers and alcohols are tetrahydrofurane (THF), dioxane, ethylene glycol monoethylether, ethylene glycol dimethylether, and aliphatic alcohols such as methanol.

Besides the solvents indicated some other aprotic polar solvents such as pyridine or non-aprotic solvents such as formamide may be less preferably employed as spinning solvents. The preferred spinning solvents are DMF and dimethylacetamide, which is notoriously used in industrial processes as an alternative to DMF, e.g. in the spinning of acrylic polymers.

The solution in para formaldehyde-DMSO may be prepared in a known way, in the way, e.g. described in the cited U.S.A. Pat. No. 4,022,631. However the known art has not appreciated the fact that under different operative conditions derivatives are obtained which have a greater or a smaller content of formaldehyde units and that the different derivatives have greatly different solubilities in organic solvents. On the other hand the known art attempts to form cellulose derivatives which will be easily and efficiently coagulated and regenerated in alkaline aqueous baths to form regenerated cellulose bodies. This requirement however has led the art in a direction opposite to the present invention since a product, when it can be easily coagulated and regenerated in alkaline aqueous baths is practically not soluble in solvents such as DMF or dimethylacetamide.

The Applicant has found that in order to obtain a methylol derivative which is soluble in DMF and in the other solvents indicated to an extent which is adequate for carrying out an industrial process, it is necessary that the molar ratio $CH_2O$/anhydroglucosidic units in the derivative should be higher than 2 and possibly not less than 3. This is obtained when the methylol derivative is prepared by dissolving cellulose in a paraformaldehyde/DMSO system, the dissolution being effected in the presence of an amount of formaldehyde in the solution which is in excess with respect to the theoretical amount necessary for the formation of the desired derivative, possibly in a strong excess, e.g. in a molar ratio 5–6 or more with respect to the cellulose, and that such an excess should be maintained in the solution during the whole process. Under such conditions the derivative formed can be precipitated with the indicated non-solvent non-regenerating agents, while it would be difficult to precipitate in an aqueous coagulating bath, and is soluble in the spinning solvents of the invention, such as the DMF and dimethylacetamide.

From the solution in the spinning solvent the derivative may be coagulated and the cellulose concurrently regenerated by means of alkaline aqueous baths, e.g. ammonia solutions, in a way known per se; or coagulation and regeneration may be successive steps.

According to a second preferred embodiment of the invention, the methylol derivative is prepared without forming a solution thereof in DMSO, by placing the cellulose and the paraformaldehyde in contact with amounts of DMSO which are smaller than those required to form a solution, and heating the components in mutual contact, until a highly viscous mass is obtained which is soluble in the spinning solvents of the invention to form a clear solution from which regenerated cellulose bodies may be obtained by the methods hereinbefore described.

The amounts of DMSO preferably employed are comprised between 4 parts and 7.5 parts per part of cellulose. The amounts of paraformaldehyde are preferably comprised between 1.3 and 2 parts per part of cellulose all parts being by weight.

Preferably the methylol derivative is formed in a closed vessel and at a high temperature, preferably above 100° C. and e.g. close to 130° C., and is allowed to stand at said temperature for certain time, till it becomes translucid and tacky. This dissolution in the spinning solvent, e.g. DMF or dimethylacetamide, occurs preferably at a temperature below that of the formation of the derivative, and below 100° C., but still in the hot.

Although the process according to the invention may seem more cumbersome than other known ones, since it requires a greater number of operations, still it has great advantages both because it furnishes better products and because it is more economical. Firstly, the solvent e.g. DMF and dimethylacetamide are cheaper than DMSO, secondly they can be recovered easily and completely by known techniques. Further, for a given starting degree of polymerization (DP) of the cellulose, the new process permits to prepare more concentrated solutions or solutions having the same concentration and a lower viscosity. Finally, this is very important for the quality of the finished product, particularly yarns and fibres, it has been found that operating according to the invention, the polymerization degree (DP) of the final regenerated polymer is higher than that found from spinning solution in DMSO, the starting cellulose being the same and all other conditions being equal, which means that the dispersion is lower and in particular the lower polymeric fractions are eliminated. A final polymer of higher quality and products having higher characteristics are therefore obtained.

In an alternative variant of the above described first embodiment of the invention, wherein a DMSO solution of the derivative of formaldehyde and cellulose is prepared, said derivative is transferred from the solution in DMSO to the solution in the spinning solvent without an intermediate precipitation by means of a non-solvent non-regenerating agent. In this case it is convenient that a certain amount of DMSO be contained in the solution in the spinning solvent. The DMSO can be completely removed from the spinning solvent and/or from the spinning baths and recovered. According to one mode of operation, the solution of the methylol derivative in DMSO is concentrated by evaporation, preferably at a reduced pressure and at temperature which will cause the evaporation of the DMSO but not the thermal decomposition of the methylol derivative, until a major portion of the DMSO, e.g. 80%, has been eliminated, whereby a gelatinous mass is obtained which may be dissolved in a spinning solvent such as DMF, to obtain a spinning solution from which the regenerated cellulose bodies may be formed by coagulation in an aqueous alkaline bath.

According to another mode of operation, when the spinning solvent has a boiling point significantly higher than that of the DMSO, spinning solvent may be added to the solution of the methylol derivative in the DMSO and subsequently the DMSO may be distilled from said solution. This method is applicable when the spinning solvent e.g., is hexamethylphosphoramide or N-Methylpyrrolidone.

According to a further variant of the invention, on the other hand, a major part of the DMSO may be distilled from the initial methylol derivative solution and subsequently a non-solvent non-regenerating agent such as e.g. THF (tetrahydrofurane) may be used, which is capable of precipitating the cellulose derivative even from gelatinous masses such as those resulting from the distillation of the major portion of the DMSO; the amount of the THF employed in this variant to precipitate the methylol derivative is further substantially smaller than would otherwise be required. The precipitate thus obtained may be dissolved in a spinning solvent.

Further variants of the invention permit to obtain solutions of the methylol derivative in spinning solvent which are completely or substantially free from DMSO. In one of said variants, once the solution of cellulose derivative in DMSO has been prepared, the spinning solvent, e.g. DMF, is added thereto, whereby a mixed solution is obtained from which the cellulose derivative may be precipitated by means of a non-solvent non-regenerating agent. The precipitate, suitably washed, may be re-dissolved in the spinning solvent and a solution is thus obtained which contains only traces of sulphur.

According to a further variant two precipitations are carried out, viz. the solution in DMSO is prepared, the cellulose derivative is precipitated by means of the non-solvent non-regenerating agent, the filtered and washed precipitate is dissolved in a spinning solvent, the derivative is precipitated out a second time from the solution by means of a non-solvent non-regenerating agent, and the precipitate is once again washed and dissolved in the spinning solvent, whereby a solution is obtained which is practically free from sulphur and has the same ratios between cellulose and formaldehyde units as the solution obtained after the first precipitation.

A number of embodiments which illustrate and do not limit the invention will now be described. Therein the symbol DP indicates the average polymerization degree, determined through measures of viscosity in solution of cuproethylenediamine.

Example 1 illustrates the embodiment wherein a solution of methylol derivative in DMSO is prepared, the said derivative is then precipitated by means of THF, the derivative is dissolved in DMF, and the cellulose is precipitated and regenerated in aqueous ammonia coagulating baths.

EXAMPLE 1

Formaldehyde obtained by thermal depolymerization of commerical formaldehyde (97% pure powder) is bubbled through a suspension of 2.15 parts of cellulose (DP~650) in 92.6 parts of DMSO at 85°. The dissolution takes place in about 20 minutes. In the limpid solution 5.23 parts of formaldehyde units (titrated with $Na_2SO_3$) are found.

Said solution is poured slowly under efficient stirrig into a glass containing anhydrous tetrahydrofurane. A white gummy solid filament is precipitated which is slowly disintegrated by the stirrer. The tetrahydrofurane is decanted, fresh THF is added, the mass is stirred once more and is quickly filtered through a gooch filter. Washing with THF is carried out on the filter.

The precipitate is transferred to a flask, 85 parts of DMF are added and the THF remained in the precipitate is evaporated at 40° C. and 20 mmHg pressure. The dissolution in DMF is completed by using an Ultraturrax stirrer to destroy the gels which are formed in a first stage. The resulting limpid solution contains 3.45% of formaldehyde and 3.2% of DMSO. Transparent regenerated cellulose films are obtained from the solution by coagulation in 30% aqueous $NH_3$ and subsequent washing in $H_2O$. The cellulose concentration in the aforesaid solution, as derived from the coagulation data, is 2.25%.

The following examples illustrate the preparation of analogous solutions in DMF, spinnable in the same way as the solutions of Example 1.

EXAMPLE 2

A solution obtained by heating at 130° for 2 hours a mixture of textile cellulose (~7% moisture), commercial paraformaldehyde (95% purity) and DMSO in the weight ratios 5.5/7.7/86.8, has given the following analytical data:

| | |
|---|---|
| Cellulose % | = 5.2 |
| $(CH_2O)$ % | = 6.84 ($\frac{CH_2O}{cell}$ = 7.1) |
| Viscosity (20° C.) | = 1184 poise |
| $\overline{DP}$ | = 465 |

582.5 parts of said solution are precipitated in anhydrous tetrahydrofurane (THF), filtered through a gooch, and washed twice on the filter with THF without allowing the precipitate to dry.

The moist precipitate is redissolved in 500 parts of DMF, in the cold, while concurrently degassing under a vacuum.

The resulting solution has given the following analytical data:

| | |
|---|---|
| Cellulose % | = 4.98 |
| $CH_2O$ % | = 3.44 ($\frac{CH_2O}{cell}$ = 3.72) |
| Viscosity (20° C.) | = 247 poise |
| DMSO | = 4.97% |
| $\overline{DP}$ | = 476 |

EXAMPLE 3

3100 parts of a solution of cellulose/$CH_2O$/DMSO in weight ratios 5.35/6.11/88.54 (cellulose $\overline{DP}$=400, viscosity at 20° ~540 poise) have been precipitated with 9950 parts of THF. The precipitate has been filtered on a gooch, has been washed on the filter with fresh THF and has been summarily dried on the filter itself.

341 parts of this humid precipitate have been redissolved in 1100 parts of DMF. The solution has then been degassed at 40° for one night under vacuum and has the following analytical characteristics:

| | |
|---|---|
| Cellulose | 6.55% |
| $CH_2O$ | 4.42% (MS = 3.64) |
| S | 3.3% |

Viscosity at 20° ~760 poise

Said solution has been spun in a bath consisting of 5% $NH_3$ in $H_2O$ with a gold-platinum spinneret having 175 65 micron orifices.

The spinning conditions and the characteristics of the yarn obtained have been the following

Spinning Conditions

| | | |
|---|---|---|
| Viscose temperature | | 52° C. |
| Temp. I° | coagulating bath ($NH_3/H_2O$) | 18° C. |
| Temp. II° | bath ($H_2O$) | 16° C. |
| Temp. III° | bath ($H_2O$) | 42° C. |
| Temp. IV° | bath ($H_2O$) | 52° C. |
| Temp. V° | bath ($H_2O$) | 71° C. |
| Drawing ratio | 50% | |
| Drying: hot roller at 110° C. | | |

Yarn Characteristics

| | | |
|---|---|---|
| Count (denier) | | 2.8 |
| Tenacity (gr/den) | conditioned | 2.9 |
| | humid | 10.4 |
| Loop tenacity (gr/den) | | 1.2 |
| Elongation % | conditioned | 7.6 |
| | humid | 10.4 |

Shape of transverse cross-sections: round
$\overline{DP}$ = 443

EXAMPLE 4

The operations of Example 1 are repeated, but using hexamethylphosphoramide (HMPT) in place of DMF. The resulting clear solution had 2.26% of cellulose and 2.13% of formaldehyde, and was spinable as the solution of Example 1.

EXAMPLE 5

A solution in DMSO is prepared as in Example 1. 50 parts of HMPT are added to 70 parts of said solution, and the DMSO is distilled off at 90° and 2-3 mmHg. A solution in HMPT is obtained analogous to that of Example 4.

The following Example 6 illustrates the preparation of a spinning solution in DMF which still contains a part of the initial DMSO, without an intermediate precipitation.

EXAMPLE 6

118.83 parts of a viscous solution of methylolcellulose in DMSO, prepared by known techniques (cellulose 5.3%, $CH_2O$=6.3%, viscosity at 20 °C. about 380 poise) are concentrated in a rotary evaporator at ~75° C., and at a low pressure (mechanical pump, residual pressure 2 mmHg) for 1 hour and 30 minutes. 32.83 parts of a jelly are obtained which by treatment under efficient stirring with 70 parts of DMF produce a solution which presents the following characteristics:

| Cellulose | 5.94% |
| $CH_2O$ | 6.21% |
| Sulphur | 8.10% (DMSO = 19.76%) |

Viscosity at 20° C. ~225 poise

The cellulose may be easily regenerated from said solution in the form of a film by coagulation in aqueous $NH_3$ bath.

The following Example 7 illustrates the elimination of the major portion of the DMSO by distillation and subsequent precipitation by a non-solvent non-regenerating agent.

EXAMPLE 7

300.35 parts of a viscous solution of methylolcellulose in DMSO, prepared by known techniques (cellulose=5.3%, $CH_2O$=6.3%), are concentrated in a rotary evaporator at a temperature lower than or equal to 80° C. and at a lower pressure (mechanical pump). After 2 hours 99.62 parts of an almost solid jelly are obtained which jelly is broken up and treated with 175 parts of THF, added drop by drop until precipitation.

The product is filtered through a gooch, the precipitate is washed with fresh THF and is summarily dried on the gooch while the vacuum is inserted. 63 parts of a slightly humid white product are obtained. The precipitate is transferred to a glass and is dissolved in 125 parts of DMF under efficient stirring. The resulting solution has given the following analytical data:

| cellulose | = 7.79% |
| $CH_2O$ | = 5.88% |
| S | = 4.36% (DMSO = 10.63%) |

From said solution the cellulose may be easily regenerated in the form of a film by coagulation in aqueous $NH_3$ bath.

The following examples 8-9 and 10 illustrative the formation of cellulose derivatives in other aprotic solvents, specifically in dimethylacetamide, tetramethylurea and N-methyl-pyrrolidone.

EXAMPLES 8, 9 AND 10

100 parts of a solution of cellulose/$CH_2O$/DMSO in the weight ratios 5.4/6.3/88.3 (DP=377, viscosity about 700 poise) are diluted under stirring with 135 parts of THF until precipitation begins. The precipitation is then completed with more THF, the product is filtered, the precipitate is washed and is placed under a vacuum of about 20 mmHg for one hour at about 40° C. and is then redissolved in:

(a) Dimethylacetamide, whereby a 4% cellulose and 3% $CH_2O$ solution is obtained;

(b) Tetramethylurea, whereby a 3.5% cellulose and 2.5% $CH_2O$ solution is obtained;

(c) N-methylpyrrolidone, whereby a 4.5% cellulose and 2.84% $CH_2O$ solution is obtained.

The solutions are found to be stable for at least 40 hours and easily coagulate in 5% ammonia solutions.

The following example illustrates the precipitation of the methylol derivative from solutions in DMSO with a non-solvent non-regenerating agent different from THF and precisely with methyl alcohol.

EXAMPLE 11

30 parts of a solution of cellulose/$CH_2O$/DMSO in the weight ratios 5.4/6.3/88.3 (DP=377, viscosity about 700 poise) are treated with methyl alcohol. An intermediate precipitation of a gelatinous mass occurs, which mass is filtered and washed and redissolved in DMF to furnish a 3.7% cellulose and 4.8% $CH_2O$ solution.

The following examples 12 and 13 illustrate the preparation of methylol derivative solutions in DMF which are free of practically free from DMSO.

EXAMPLE 12

100 parts of a solution of cellulose/$CH_2O$/DMSO in the weight ratios 5.4/6.3/88.3 (DP=377, viscosity about 700 poise) are diluted under stirring with DMF until a DMF/DMSO=1:1 ratio, e.g., is obtained. Said solution in turn is precipitated with THF and the precipitate is filtered and washed and redissolved in DMF, whereby a solution is obtained which contains 4.3% of cellulose with 3.3% of $CH_2O$ and traces of sulphur. The cellulose may be easily regenerated from this solution in the form of a film by coagulation in aqueous ammonia bath.

EXAMPLE 13

100 parts of a solution of cellulose/$CH_2O$/DMSO in the weight ratios 5.4/6.3/88.3 (DP=377, viscosity about 700 poise) are precipitated with THF and the precipitate is filtered and washed and redissolved in DMF, whereby a solution is obtained which contains 4.6% of cellulose and 3% of $CH_2O$ with a content of DMSO equal to 8.5%. This latter solution is in turn treated with THF: a precipitate is obtained which is filtered and washed and once again redissolved in DMF. A solution is thus obtained which is free from sulphur and with the same cellulose/$CH_2O$ ratio as the solution obtained after the first precipitation.

From said solution the cellulose may be easily regenerated in the form of a film by coagulation in aqueous ammonia baths.

EXAMPLE 14

A mixture of 48 parts of Rayselect-J/cellulose ($\overline{DP}$ 495), 63 parts of powdery commercial formaldehyde, and 216 parts of dimethylsulphoxide is heated in a closed glass reactor under powerful stirring up to 130° C. and is left at this temperature for one hour. A highly viscous mass, having a slight yellow colour, translucid and tacky is obtained. Said mass is cooled at 70° and 313 parts of dimethylformamide are added. Stirring is carried out again for 20 minutes and a clear solution is obtained. Typical analytical data of this solution are:

| | |
|---|---|
| Cellulose | 7.6% |
| $CH_2O$ | 9.3% |
| Viscosity at 20° | ~ 1950 poise |
| Viscosity at 40° | ~ 750 poise |
| Viscosity at 60° | ~ 330 poise |
| DP | ~ 440 |

From said solutions the cellulose may be easily regenerated by coagulation, e.g., in an aqueous $NH_3$ bath.

Although a number of embodiments of the invention have been described for illustrative purposes, the invention may be carried out with many modifications and adaptions by persons skilled in the art and without exceeding the scope of the invention itself.

We claim:

1. A process for the preparation of solutions of cellulose derivatives from which regenerated cellulose bodies may be prepared by coagulation and regeneration, characterized in that a methylol derivative of cellulose is prepared, which derivative contains more than 2 units for formaldehyde per anhydroglucosidic unit, and said derivative is dissolved in an organic spinning solvent selected from the group consisting of polar aprotic solvents containing N-substituted amide moieties in their structure, pyridine, and formamide.

2. A process according to claim 1, characterized in that the methylol derivative contains at least 3 units of formaldehyde per anhydroglucosidic unit.

3. A process according to claim 1, characterized in that the methylol derivative is prepared by contacting cellulose with paraformaldehyde and DMSO.

4. A process according to claim 1, characterized in that the spinning solvent is a polar aprotic solvent selected from the group consisting of dimethylformamide (DMF), dimethylacetamide, tetramethylurea, N-methylpyrrolidone and hexamethylphosphoramide (HMPT).

5. A process according to claim 3, characterized in that cellulose is dissolved in a system composed of paraformaldehyde and DMSO, and the methylol derivative of cellulose thus formed is separated from the DMSO and brought into solution, without regeneration of the cellulose, in the spinning solvent.

6. A process according to claim 5, characterized in that the methylol derivative is separated from the DMSO by precipitating it from the solution in DMSO by means of at least one agent which is a non-solvent non-regenerating agent of the cellulose and is miscible with DMSO.

7. A process according to claim 6, characterized in that the non-solvent non-regenerating agent is selected from the group consisting of ethers, esters, alcohols, aldehydes, ketones and chlorinated organic liquids.

8. A process according to claim 7, characterized in that the non-solvent non-regenerating agent is selected from the group consisting of cyclohexane, acetone, benzaldehyde, chloroform, tetrahydrofurane, dioxane, ethylene glycol nonoethylether, dimethylether, and methanol.

9. A process according to claim 6, characterized in that the non-solvent non-regenerating agent is selected from the group consisting of acetonitrile and ethyl acetate.

10. A process according to claim 5, characterized in that the dissolution of the cellulose is effected in the presence of an amount of formaldehyde in excess of the theoretical amount relative to the desired methylol derivative.

11. A process according to claim 5, characterized in that the solution of the cellulose derivative in DMSO is concentrated by evaporation until a major portion of the DMSO has been removed.

12. A process according to claim 5, characterized in that an organic spinning solvent having a boiling point higher than that of DMSO is added to the solution of methylol derivative in DMSO and subsequently at least a major portion of the DMSO is distilled.

13. A process according to claim 5, characterized in that a major portion of the DMSO is distilled from the solution of methylol derivative in DMSO, and said methylol derivative is precipitated by means of a non-solvent non-regenerating agent, and the precipitate is dissolved in the organic spinning solvent.

14. A process according to claim 5, characterized in that an organic spinning solvent is added to the solution of methylol derivative in DMSO, said derivative is precipitated from the resulting solution by means of a non-solvent non-regenerating agent, and the said derivative is re-dissolved in the same spinning solvent.

15. A process according to claim 5, characterized in that the methylol derivative is precipitated from its solution in the spinning solvent by means of a non-solvent non-regenerating agent, and the precipitate is washed and thereafter dissolved in spinning solvent.

16. A process according to claim 3, characterized in that the methylol derivative is prepared by contacting cellulose and paraformaldehyde with an amount of DMSO smaller than that required for the formation of a solution.

17. A process according to claim 16, characterized in that the cellulose and the formaldehyde are contacted with the DMSO and are heated to temperatures above 100 ° C.

18. A process according to claim 16, characterized in that the cellulose, the formaldehyde and the DMSO are left in contact at elevated temperatures until a translucid, tacky mass, soluble in the spinning solvent is formed.

19. A process according to claim 16, characterized in that from 4 to 7.5 parts by weight of DMSO and from 1.3 to 2 parts of paraformaldehyde per part of cellulose are used.

20. A process according to claim 16, characterized in that the methylol derivative is dissolved in the spinning solvent at elevated temperatures, but below 100° C.

21. A process for the preparation of formed bodies, in particular filaments, of regenerated cellulose, characterized in that a solution of cellulose derivative in a spinning solvent is prepared according to claim 1, and the cellulose derivative is coagulated from said solution and the cellulose is regenerated by means of at least one coagulating and regenerating bath.

22. A process according to claim 21, characterized in that the bath is an aqueous alkaline bath.

23. A process according to claim 22, characterized in that the aqueous alkaline bath is an aqueous ammonia solution.

* * * * *

UNITED STATES PATENT AND TRADEMARK OFFICE
CERTIFICATE OF CORRECTION

PATENT NO. : 4,237,274
DATED : December 2, 1980
INVENTOR(S) : Roberto LEONI; Alberto BALDINI; Gianfranco ANGELINI It is certified that error appears in the above-identified patent and that said Letters Patent are hereby corrected as shown below:

Column 2, line 22, change "N-methylpyrraolidone" to -- N-methylpyrrolidone --.

Column 7, line 17, at the end of the line, cancel "32" and substitute -- = -- in its stead.

Column 9, line 30, change "for" to -- of --.

Signed and Sealed this

Twenty-ninth Day of September 1981

[SEAL]

Attest:

GERALD J. MOSSINGHOFF

Attesting Officer

Commissioner of Patents and Trademarks